(12) United States Patent
Hayashi et al.

(10) Patent No.: US 8,465,083 B2
(45) Date of Patent: Jun. 18, 2013

(54) REAR STRUCTURE OF STRADDLE-RIDE TYPE VEHICLE

(75) Inventors: Kanji Hayashi, Saitama (JP); Ryuichi Nakanishi, Saitama (JP); Yoshihiro Inoue, Saitama (JP); Kyotaro Kajitori, Saitama (JP); Akira Omae, Saitama (JP); Takaaki Kato, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 280 days.

(21) Appl. No.: 12/959,083

(22) Filed: Dec. 2, 2010

(65) Prior Publication Data
US 2011/0133511 A1 Jun. 9, 2011

(30) Foreign Application Priority Data

Dec. 7, 2009 (JP) ................................. 2009-277546

(51) Int. Cl.
*B62D 61/02* (2006.01)

(52) U.S. Cl.
USPC ......................... 296/180.1; 296/37.1; 180/219

(58) Field of Classification Search
USPC ................. 296/180.1, 37.1; 180/219; 224/413
See application file for complete search history.

(56) References Cited

U.S. PATENT DOCUMENTS

| 3,227,236 | A | * | 1/1966 | Burton | 180/230 |
| 3,987,495 | A | * | 10/1976 | Holley | 2/410 |
| 4,441,752 | A | | 4/1984 | Buehrig | |
| 4,582,158 | A | | 4/1986 | Hamane | |
| 6,520,275 | B2 | * | 2/2003 | Galbraith et al. | 180/219 |
| 2006/0027407 | A1 | | 2/2006 | Tsukada et al. | |

FOREIGN PATENT DOCUMENTS

| DE | 1630336 A1 | 9/1971 |
| EP | 1506911 A1 | 2/2005 |
| EP | 1914158 A2 | 4/2008 |
| JP | 2006-44539 A | 2/2006 |

* cited by examiner

Primary Examiner — Joseph Pape
(74) Attorney, Agent, or Firm — Birch, Stewart, Kolasch & Birch, LLP

(57) ABSTRACT

In a vehicle whose tire is wholly covered from the left, right and back, a negative pressure area to the rear of the vehicle is reduced. In a vehicle including a left trunk and a right trunk in a rear portion of the vehicle, a rear fender continuous with respective rear faces of the left and right trunks is provided, and a plane formed of the respective rear faces of the left and right trunks and the rear fender is provided with negative pressure correction holes.

13 Claims, 7 Drawing Sheets

REAR STRUCTURE OF STRADDLE-RIDE TYPE VEHICLE

CROSS-REFERENCE TO RELATED APPLICATIONS

The present application claims priority under 35 USC 119 to Japanese Patent Application No. 2009-277546 filed on Dec. 7, 2009 the entire contents of which are hereby incorporated by reference.

BACKGROUND OF THE INVENTION

1. Field of the Invention

The present invention relates to a rear structure of a straddle-ride type vehicle.

2. Description of Background Art

Many vehicles such as relatively large-sized scooter-type or cruiser-type motorcycles are such that a tire is wholly covered from the left, right and back. For example, Japanese Patent Laid-open No. 2006-44539 discloses a motor-driven two-wheeled vehicle whose tires are wholly covered from the left, right and back. This vehicle is provided with air flow outlets at positions to the rear of a storage box below a seat and of auxiliary machinery covers on the sides of the seat. Auxiliary machinery is installed in each of the auxiliary machinery covers. In this way, air flow having cooled the auxiliary machinery is discharged from the outlets.

Some vehicles whose tire is wholly covered from the left, right and back are each provided with left and right trunks at the rear portion and are each such that the rear surfaces of the left and right trunks are made continuous with a rear fender. In these vehicles, the tire is covered from the left and right by the left and right trunks.

In addition, the vehicles whose tire is wholly covered from the left, right and back as described above tend to enlarge a negative-pressure area (turbulence zone) to the rear of the vehicle. Therefore, there arises a problem with a reduction in the negative-pressure area to the rear of the vehicle.

SUMMARY AND OBJECTS OF THE INVENTION

The present invention has been made in view of such situations and aims to provide a rear structure of a straddle-ride type vehicle that can achieve a reduction in the negative-pressure area to the rear of the vehicle, the vehicle having a tire wholly covered from the left, right and back.

According to an embodiment of the present invention, a rear structure of a straddle-ride type vehicle is provided that includes a left trunk 23 and a right trunk in a rear portion of the vehicle (e.g. the motorcycle 1 in the embodiment), a rear fender 35 continuous with respective rear faces of the left and right trunks. A plane formed of the respective rear faces of the left and right trunks and the rear fender is provided with a negative pressure correction hole (e.g. the first negative pressure correction holes 45, 45 and the second negative pressure correction holes 46, 46).

According to an embodiment of the present invention, a lighting unit 43 is provided above the rear fender and the negative pressure correction hole is provided between the rear fender and the lighting unit.

According to an embodiment of the present invention, the rear fender is provided with an eave portion 39 projecting obliquely downwardly, the negative pressure correction hole is provided on a deep side of the eave portion, and air discharged from the negative pressure correction hole is made to flow toward the negative pressure center to the rear of the vehicle.

According to an embodiment of the present invention, a central trunk 22 is provided above the rear fender and a negative pressure correction hole is further provided at a lower portion of the central trunk.

According to an embodiment of the present invention, a ventilating hole (e.g. the ventilating holes 21L, 21R in the embodiment) is provided forward of each of the left and right trunks.

According to an embodiment of the present invention, the air in the rear wheel tire house, i.e., in the rear fender can be led toward the center of the negative pressure area (the turbulence zone) to the rear of the vehicle. Therefore, the negative pressure area to the rear of the vehicle can be reduced. The reduced inner pressure in the rear wheel tire housing can increase the grounding load of the rear tire to improve the grip force of the tire. Further, air can be passed through the tire housing covered by the cover to thereby cool the brake disk.

According to an embodiment of the present invention, the negative pressure correction hole is provided between the rear fender and the lighting unit. Therefore, the negative pressure correction hole can be made inconspicuous. Thus, the degree of freedom of design can be improved.

According to an embodiment of the present invention, air is led along the rear side of the eave portion. Therefore, air can be led toward the center of the negative pressure area. Thus, the negative pressure area can be reduced effectively. Since the negative pressure correction hole is provided at a place hidden by the eave portion, it can be made inconspicuous. Thus, the degree of freedom of design can be improved.

According to an embodiment of the present invention, since the negative pressure correction hole can be provided inconspicuously, the degree of freedom of design can be improved. More specifically, for example, in the case where the central trunk is shaped to protrude rearwardly, if the negative pressure correction hole is provided at a deep portion between the central trunk and the rear fender, the negative pressure correction hole can be made inconspicuous. Thus, the degree of freedom of design can be improved.

According to an embodiment of the present invention, pressure concentration at front portions of the left and right trunks due to a flow of air can be reduced. Therefore, travel resistance can be reduced. Since the pressure-receiving area is reduced, yawing moment applied to the vehicle body due to side wind can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will hereinafter be described with reference to the drawings. There is illustrated a motorcycle 1 provided with a structure according to the present invention in FIG. 1.

Figure 1:
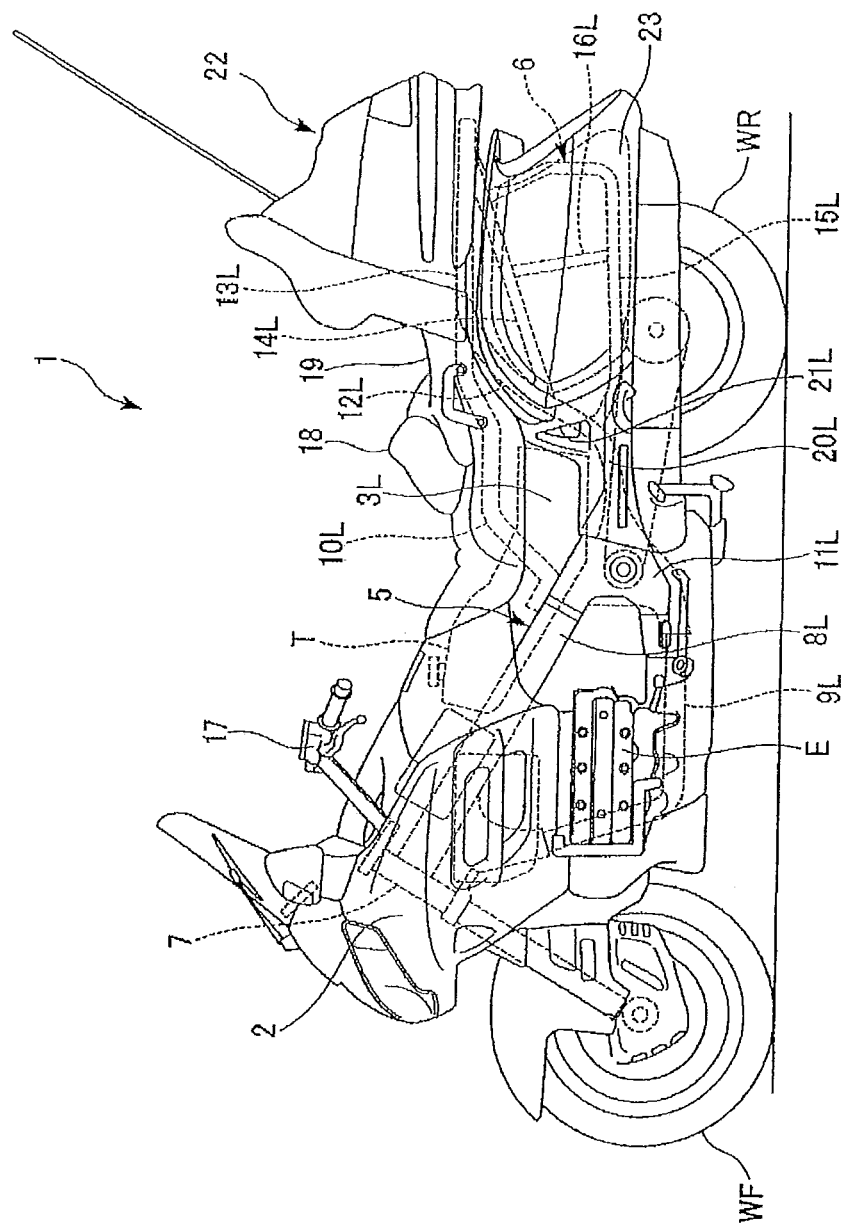
FIG. 1 is a lateral view of a motorcycle according to an embodiment of the present invention.
Figure 2:
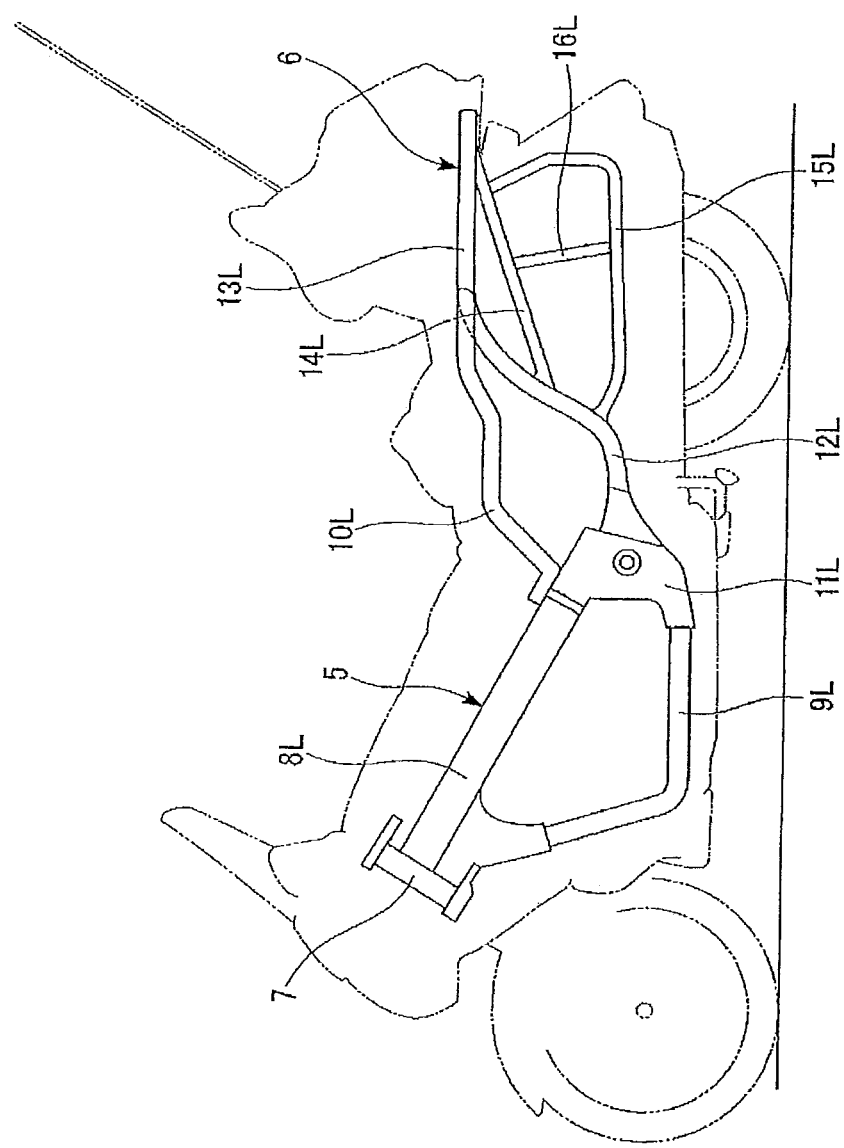
FIG. 2 illustrates a body frame of the motorcycle.

The motorcycle 1 illustrated in FIG. 1 includes an engine E between front and rear wheels WF, WR and is such that a front portion of a vehicle body is covered by a front body cover 2 and left and right lateral surfaces of the vehicle body are respectively covered by side body covers 3L, 3R (only the side body cover 3L on the front side of the paper surface is illustrated). With reference to FIG. 2, a body frame 4 forming a basic skeleton of the vehicle body of the motorcycle 1 is composed of a body frame main body 5 and a rear body frame 6.

The body frame main body 5 includes a head pipe 7; a pair of left and right main frames 8L, 8R joined to the head pipe 7 and extending toward the rear of the vehicle body in a tilted posture; a pair of left and right down frames 9L, 9R extending downward from the head pipe 7 and then toward the rear of the vehicle body; and a pair of left and right seat rails 10L, 10R joined to the corresponding rear end portions of the main frames 8L, 8R and extending toward the rear of the vehicle body. The body frame main body 5 further includes a pair of left and right central-frames 11L, 11R joined to the respective down frames 9L, 9R and to the respective seat rails 10L, 10R; and sub-frames 12L, 12R extending rearwardly and upwardly from the corresponding lower portions of the central-frames 11L, 11R and joined to the corresponding rear end portions of the seat rails 10L, 10R.

The rear body frame 6 includes a pair of left and right upper pipes 13L, 13R extending rearwardly from the corresponding rear end portions of the seat rails 10L, 10R; and a pair of left and right tilted pipes 14L, 14R extending rearwardly and upwardly from corresponding vertically generally-central areas of the sub-frames 12L, 12R to form rear end portions, which are coupled to the corresponding rear end portions of the upper pipes 13L, 13R. The rear body frame 6 further includes lower pipes 15L, 15R extending rearwardly from the corresponding lower portions of the sub-frames 12L, 12R, then upward, and coupled to the respective tilted pipes 14L, 14R; and longitudinal pipes 16L, 16R spanned between the tilted pipes 14L, 14R and the lower pipes 15L, 15R, respectively. In addition, FIGS. 1 and 2 illustrate only the main frame 8L, the down frame 9L, the seat rail 10L, the central-frame 11L and the sub-frame 12L of the body frame main body 5 on the front side of the paper surface. In addition, FIGS. 1 and 2 illustrate only the upper pipe 13L, the tilted pipe 14L, the lower pipe 15L and the longitudinal pipe 16L of the rear body frame 6 on the front side of the paper surface.

In the body frame main body 5, a steering system is turnably supported by the head pipe 7 with a handlebar 17 included in the steering system. A fuel tank T is mounted on the main frames 8L, 8R. A rider seat 18 and a pillion passenger seat 19 anteroposteriorly continuous with each other are mounted on the seat rails 10L, 10R in the rear of the fuel tank T. The engine E is mounted between the main frames 8L, 8R and the down frames 9L, 9R and below the fuel tank T.

Side body covers 3L and 3R are provided between the rider seat 18 and the main frame 8L, and between the rider seat 18 and main frame 8R, respectively. A side portion of the side body cover 3L is generally flush with a side portion of the main frame 8L and with a corresponding side portion of the rider seat 18. Similarly, a side portion of the side body cover 3R is generally flush with a side portion of the main frame 8R and with a corresponding side portion of the rider seat 18.

The rear side covers 20L and 20R (only 20L on the front side of the paper surface is illustrated) are provided rearwardly of the respective side body covers 3L and 3R. The rear side covers 20L, 20R protrude vehicle-widthwise outwardly from the corresponding rear portions of the side body covers 3L, 3R. Such protruding portions of the side body covers 3L, 3R are formed with respective ventilating holes 21L, 21R (only 21L on the front side of the paper surface is illustrated) opening forwardly obliquely. The ventilating holes 21L, 21R communicate with a tire housing S so as to lead the introduced flow of air into the tire housing S (see FIG. 5) for the rear wheel WR.

A central trunk 22 is installed rearwardly of the pillion passenger seat 19. A left trunk 23 and a right trunk 24 are installed on the left and right, respectively, of and below the central trunk 22 and rearwardly of the rear side covers 20L, 20R, respectively (only the left trunk 23 on the front side of the paper surface is illustrated). The left and right side portions of the rear wheel WR are covered by the left trunk 23 and the right trunk 24, respectively.

Figure 3:
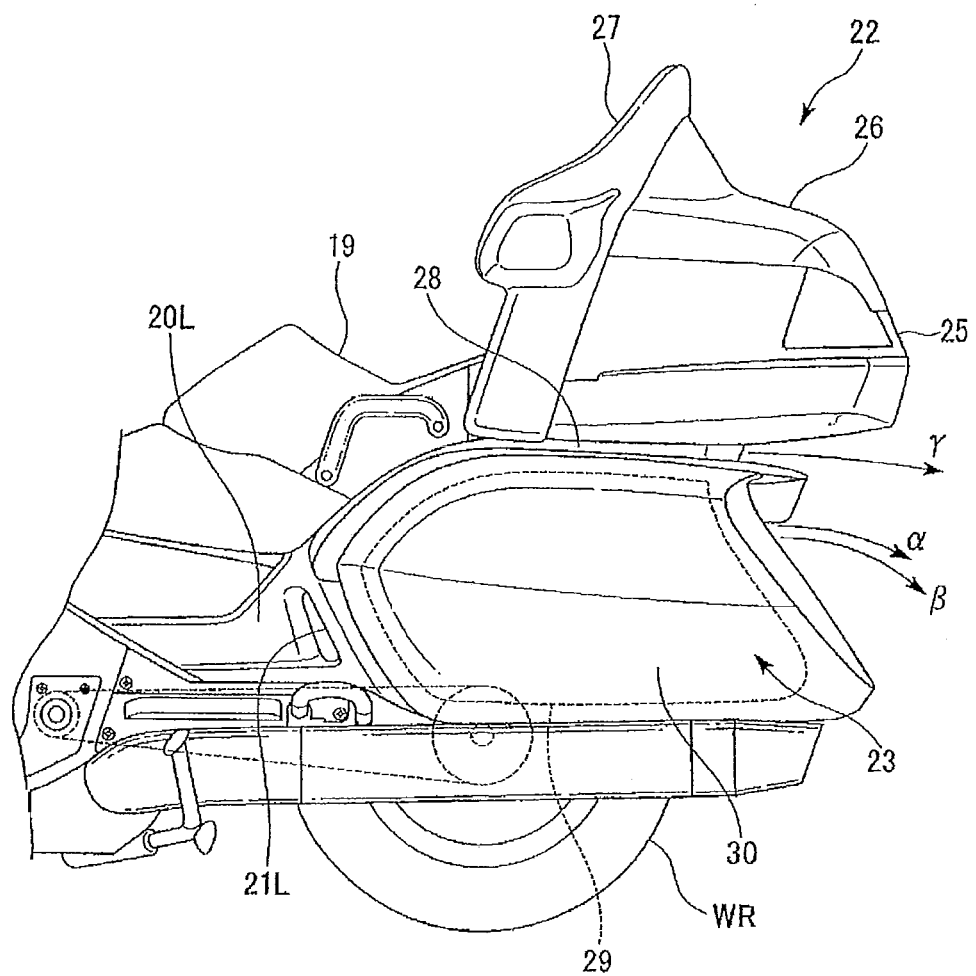
FIG. 3 is a lateral view of a rear portion of the vehicle.
Figure 4:
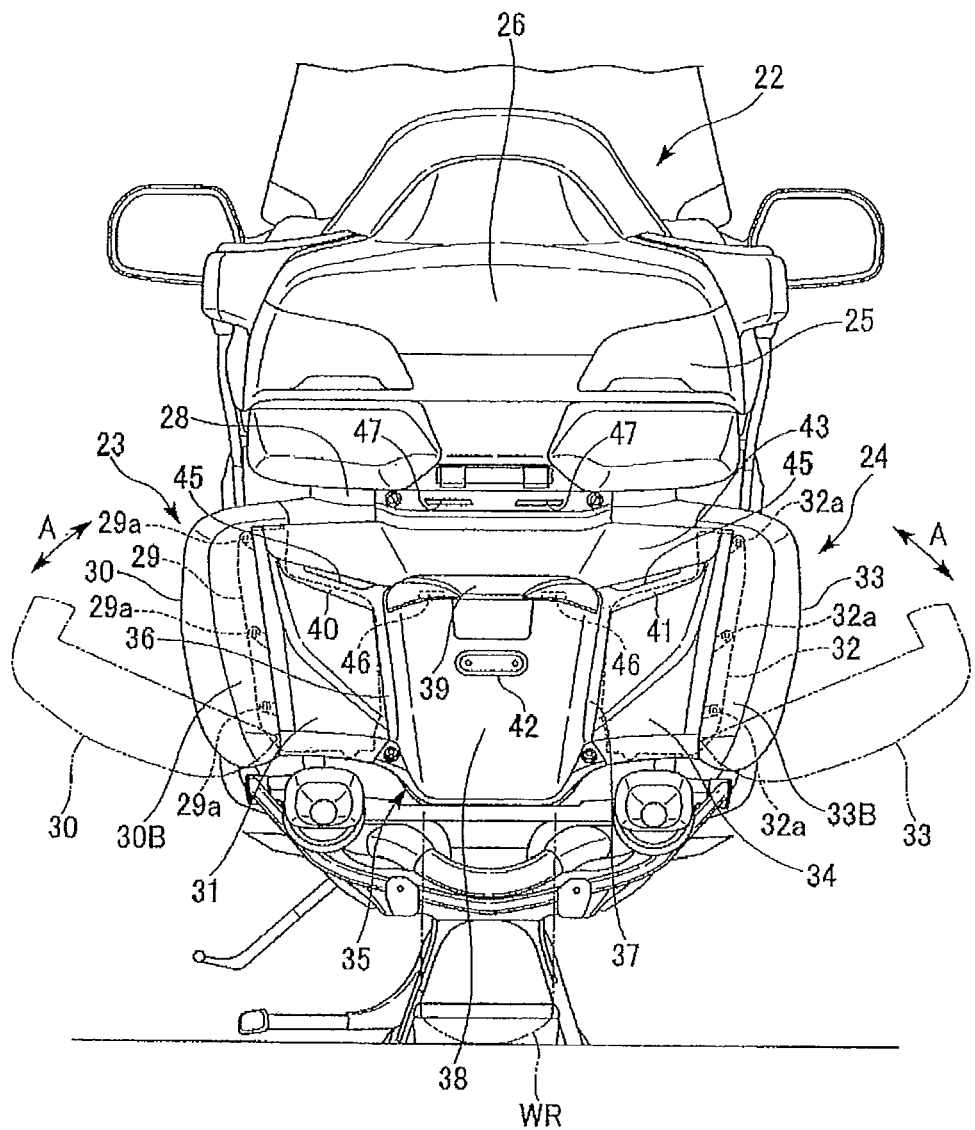
FIG. 4 is a rear view of the rear portion of the vehicle.

Referring to FIGS. 3 and 4, the central trunk 22 is composed of a trunk box main body 25 and a trunk opening/closing lid 26 as a main component. A backrest 27 for the pillion passenger seat 19 is installed on the front surface of the trunk opening/closing lid 26. A lower portion of the trunk box main body 25 is provided integrally with an attachment portion, not illustrated, with the vehicle body side. The central trunk 22 is mounted on the vehicle body side so as to allow the trunk box main body 25 to protrude toward the rear by mounting the attachment portion to the upper pipes 13L, 13R of the rear body frame 6.

The attachment portion installed at the lower portion of the trunk box main body 25 is circumferentially covered by the rear center cover 28. The rear center cover 28 extends anteroposteriorly so as to connect with the rear portion of each of the rear side covers 20L, 20R and with the upper portion of each of the left trunk 23 and the right trunk 24 as shown in FIG. 3. The rear center cover 28 is secured to the upper pipes 13L, 13R of the rear body frame 6 to have a general U-shape in a side view and to continuously cover the left, right and back of the lower portions of the trunk box main body 25.

The left trunk 23 disposed on the left of and below the central trunk 22 is composed of a trunk box main body 29, a trunk opening/closing lid 30 capable of opening/closing the trunk box main body 29, and a rear face cover 31 removably covering the rear portion of the trunk box main body 29, as a main member. Similarly, also the right trunk 24 disposed on the right of and below the central trunk 22 is composed of a trunk box main body 32, a trunk opening/closing lid 33 and a rear face cover 34, as a main member.

Figure 5:
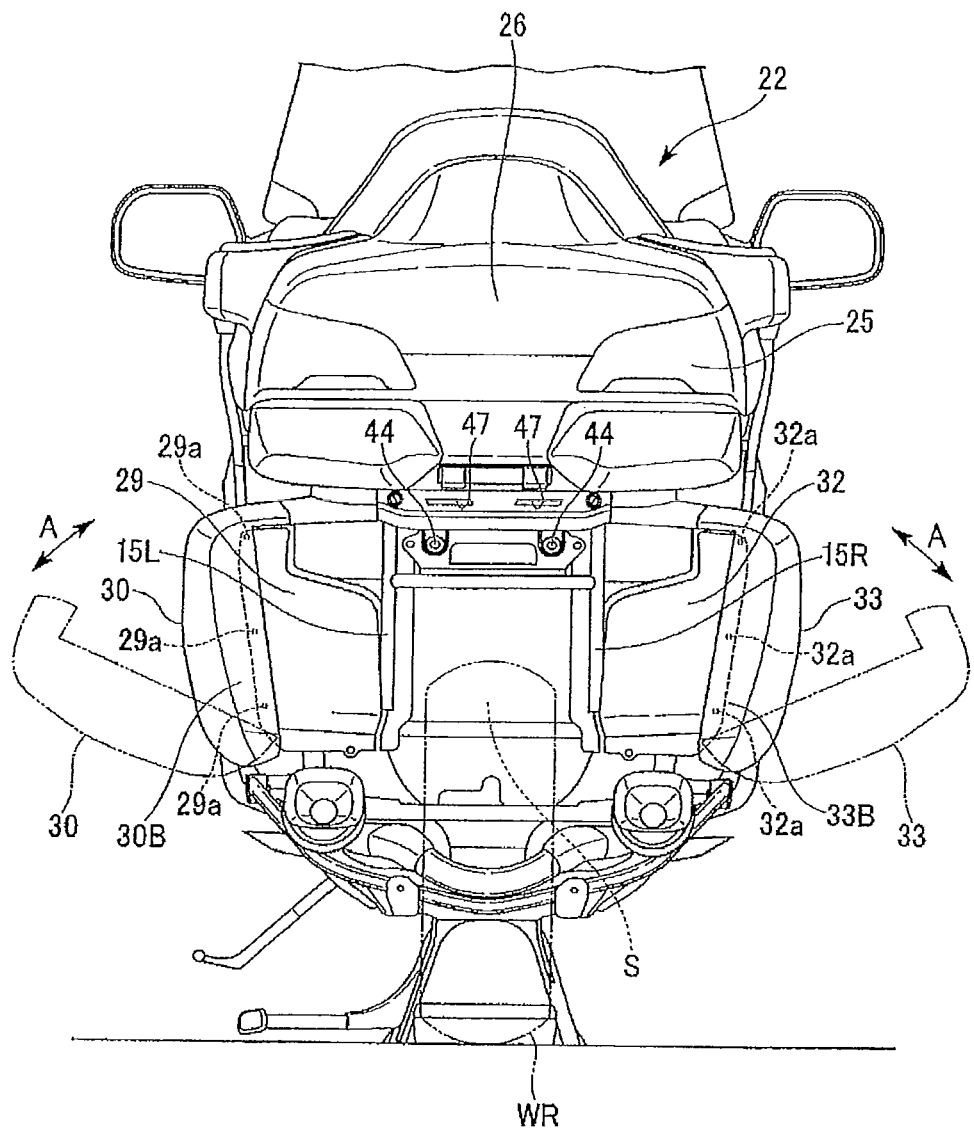
FIG. 5 is a rear view of the rear portion of the vehicle with members partially removed.

The trunk box main bodies 29, 32 form respective article-storing spaces and the trunk opening/closing lids 30, 33 open/close the corresponding article-storing spaces of the trunk box main bodies 29, 32. FIG. 5 illustrates a state where the respective rear face covers 31, 34 of the left and right trunks 23, 24 and the trunk box main bodies 29, 32 are exposed. The rear face covers 31, 34 are cover members which cover the corresponding rear portions of the trunk box main bodies 29, 32 to constitute the corresponding rear portion rear walls of the left and right trunks 23, 24.

The trunk box main bodies 29, 32 are fixedly mounted to the respective lower pipes 15L, 15R of the rear body frame 6 illustrated in FIG. 2 by tightening bolts or the like. The trunk opening/closing lids 30, 33 are turnably supported by respective support portions formed on the corresponding vehicle-widthwise outsides of the trunk box main bodies 29, 32. The trunk opening/closing lids 30, 33 are operatively turned along both-end arrows A depicted in FIGS. 4 and 5 to open/close the corresponding storing spaces of the trunk box main bodies 29, 32. In addition, symbol S in FIG. 5 denotes the tire house.

The rear face cover 31 is connected by screwing to the trunk box main body 29 via attachment portions 29a provided on the trunk box main body 29. Similarly, the rear face cover 34 is connected by screwing to the trunk box main body 32 via attachment portions 32a provided on the trunk box main body 32. The attachment portions 29a are provided on the rear side-surface of the trunk box main body 29 exposed to the outside when the trunk opening/closing lid 30 is opened. Similarly, the attachment portions 32a are provided on the rear side-surface of the trunk box main body 32 exposed to the outside when the trunk opening/closing lid 33 is opened. The rear face cover 31 is attached to the attachment portions 29a by means of stays projecting vehicle-widthwise outwardly and is provided adjacently to the rear face 30B of the trunk opening/closing lid 30 so as to extend vehicle-widthwise inwardly from the rear face 31B. Similarly, the rear face cover 34 is attached to the attachment portions 32a by means of stays projecting vehicle-widthwise outwardly and is provided adjacently to the rear face 33B of the trunk opening/closing lid 33 so as to extend vehicle-widthwise inwardly from the rear face 33B. Referring to FIG. 3, the respective rear faces 30B, 33B of the trunk opening/closing lids 30, 33 protrude rearwardly from the corresponding trunk box main bodies 29, 32. The rear face cover 31 is disposed in a space defined between a rear portion of the trunk box main body 29 and the rear face 30B of the trunk opening/closing lid 30 and is provided to form a plane continuous from the rear face 30B of the trunk opening/closing lid 30. Similarly, the rear face cover 34 is disposed in a space defined between a rear portion of the trunk box main body 32 and the rear face 33B of the trunk opening/closing lid 33 and is provided to form a plane continuous from the rear face 33B of the trunk opening/closing lid 33.

In short, the rear face covers 31, 34 form a portion of a design surface of the vehicle rear face along with the rear faces 30B, 33B of the trunk opening/closing lids 30, 33. If the left trunk 23 is viewed as a whole, the rear face of the left trunk 23 is divided by the trunk opening/closing lid 30 and the rear face cover 31. Similarly, if the right trunk 24 is viewed as a whole, the rear face of the right trunk 24 is divided by the trunk opening/closing lid 33 and the rear face cover 34.

The height dimension of each of the rear face covers 31, 34 is set to form a given gap between the rear center cover 28 and the corresponding rear face covers 31, 34. In addition, the width dimension of each of the rear face covers 31, 34 is set so that the rear face covers 31, 34 each extend in front of the rear wheel WR. A space generally equal to the width of the rear wheel WR is formed between the rear face covers 31, 34 by setting the width dimension of each of the rear face covers 31, 34. A rear fender 35 covering the rear of the rear wheel WR is provided to fill the space between the rear face covers 31, 34.

The rear fender 35 is formed like a plate. The rear fender 35 is attached to be spanned between the rear face covers 31, 34 by securing its side portions 36, 37 to respective attachment portions. These attachment portions are formed at respective lateral end edges of the rear face covers 31, 34 on the vehicle-widthwise inside thereof to have bolt fastening holes or the like not illustrated. The rear fender 35 is provided to form a plane continuous with the rear face covers 31, 34, thereby forming a design surface of a vehicle rear face along with the rear face covers 31, 34.

In addition, the rear fender 35 is supported by only the rear face covers 31, 34 by being connected to the vehicle-widthwise insides of the rear face covers 31, 34 via only the corresponding side portions 36, 37. More specifically, in the embodiment, the rear fender 35 is screwed from the back to the rear face covers 31, 34 and can be handled as an integrally assembled part (31, 34 and 35). Thus, the rear fender 35 can be removed from the vehicle body side integrally with the rear face covers 31, 34.

A detailed shape of the rear fender 35 is described with reference to FIGS. 4 and 6. The rear fender 35 is formed concavely from the side portions 36, 37, between which a main face portion 38 is formed. An eave portion 39 is formed on the main face portion 38 so as to project obliquely downward toward the rear. Extensions 40, 41 are integrally formed on the respective lateral portions 36, 37 so as to extend vehicle-widthwise outwardly along the corresponding upper portions of the rear face covers 31, 34.

A license plate attachment portion 42 is provided at a generally central area of the main face portion 38. A given space is defined between the eave portion 39 and the upper portions of the extensions 40, 41, and the rear center cover 28. A lighting unit 43 is installed in such a space. Referring to FIG. 5, lighting unit brackets 44, 44 are formed at the rear portion of the rear center cover 28. The lighting unit 43 is supported by the lighting unit brackets 44, 44.

The motorcycle 1 is provided with a plurality of negative pressure correction holes in the vehicle rear face. Referring to FIGS. 4 and 6, the rear fender 35 is formed with first negative pressure correction holes 45, 45 and second negative pressure correction holes 46, 46. The rear center cover 28 is formed with third negative pressure correction holes 47, 47.

The first negative pressure correction holes 45, 45 are each provided between a corresponding one of the extensions 40, 41 of the rear fender 35 and the lighting unit 43. More specifically, the first negative pressure correction holes 45, 45 are each formed by partially cutting out a corresponding one of the upper portions of the extensions 40, 41. The second negative pressure correction holes 46, 46 are provided dividedly right and left on the back side of the eave portion 39 of the rear fender 35 and are each formed like a slit.

The third negative pressure correction holes 47, 47 are provided at the rear portion of the rear center cover 28, i.e., at a deep position of the lower portion of the trunk box main body 25. The third negative pressure correction holes 47, 47 are each formed like a slit.

The first negative pressure correction holes 45, 45, the second negative pressure correction holes 46, 46 and the third negative pressure correction holes 47, 47 communicate with the tire housing S (see FIG. 5) for the rear wheel WR on the back of the rear fender 35. The flow of air introduced into the tire housing S from the respective ventilating holes 21L, 21R of the rear side covers 20L, 20R are designed to flow rearwardly from the first negative pressure correction holes 45, 45, the second negative pressure correction holes 46, 46 and the third negative pressure correction holes 47, 47.

Figure 6:
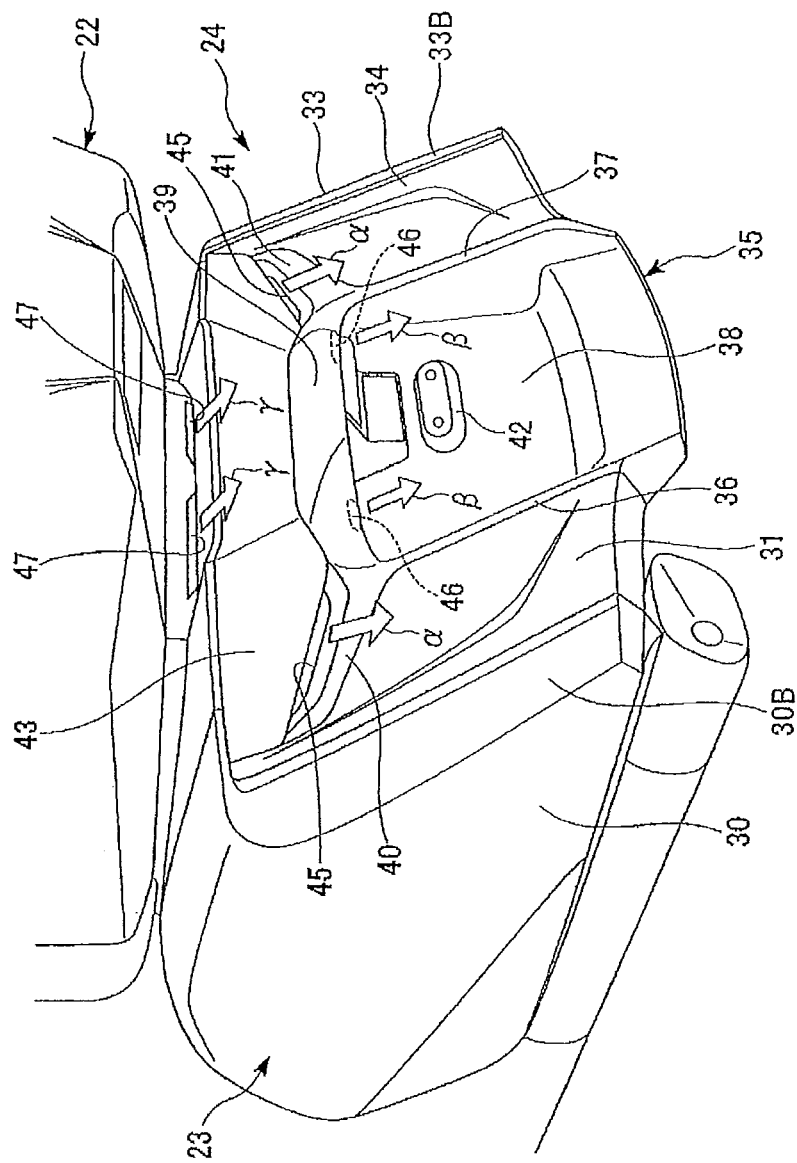
FIG. 6 is a perspective view of the rear portion of the vehicle.

Referring to FIGS. 2 and 6, symbol α denotes a flow of air that passes through the first negative pressure correction holes 45, 45 from the tire housing S and flows toward towards the rear. Symbol β denotes a flow of air that passes through the second negative pressure correction holes 46, 46 and flows towards the rear. In addition, the flow of air β is led along the back side of the eave portion 39. Symbol γ denotes a flow of air that passes through the third negative pressure correction holes 47, 47 from the tire housing S and flows rearwardly.

Figure 7:
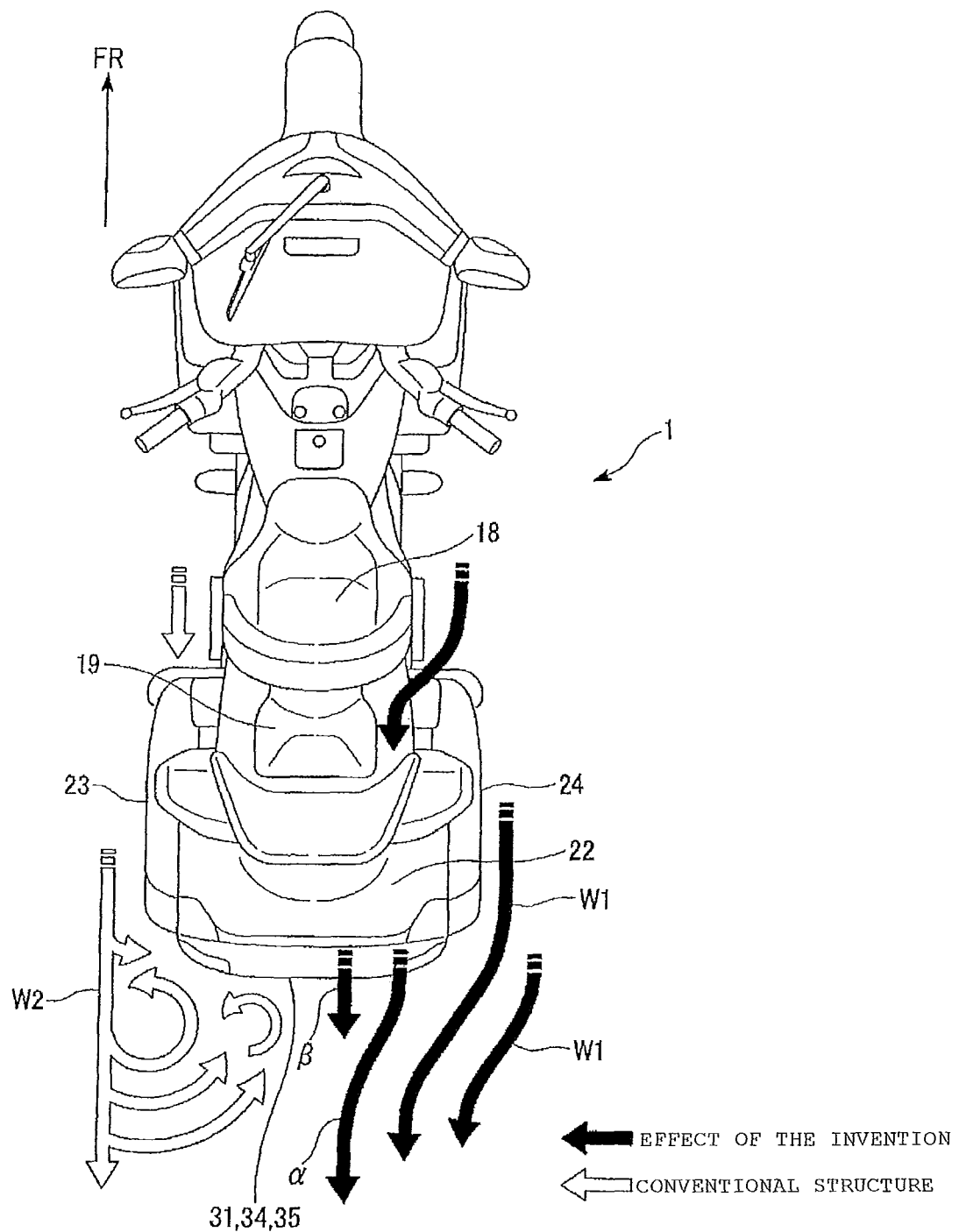
FIG. 7 is a view for assistance in explaining the flow of air to the motorcycle.

In the embodiment as described above, as comprehensibly illustrated in FIGS. 4 and 6, the motorcycle 1 provided with the left trunk 23 and the right trunk 24 at the vehicle rear portion is provided with the rear fender 35 continuous with the rear face covers 31, 34 forming the corresponding rear faces of the left and right trunks 23, 24. The plane formed of the rear face covers 31, 34 and the rear fender 35 is provided with the first negative pressure correction holes 45, 45 and the second negative pressure correction holes 46, 46. In this way, the air in the rear wheel tire housing S (see FIG. 5) in the rear fender 35 can be led toward the center of the negative pressure area (the turbulence zone) to the rear of the vehicle. Thus, the negative pressure area to the rear of the vehicle can be reduced. More specifically, in FIG. 7, symbol W2 shown on the left side on the paper surface denotes a flow of air in a conventional structure, whereas symbol W1 shown on the right side in the paper surface denotes a flow of air in the structure according to the present embodiment. As illustrated in the FIG. 7, the conventional structure causes an air-flow as being sucked toward the vehicle-widthwise inside in the rear of the vehicle as indicated with the flow of air W2, which causes the negative pressure area (the turbulence zone). However, in the structure according to the present embodiment, the flow of air α and β flows from the first negative pressure correction holes 45, 45 and the second negative pressure correction holes 46, 46, respectively, toward the center of the negative pressure area (the turbulence zone) to the rear of the vehicle to correct the air-flow as sucked in the vehicle-widthwise inside to move to the rear. Therefore, the negative pressure area to the rear of the vehicle can be reduced. In addition, since also the air-flow from the third negative pressure correction holes 47, 47 moves similarly, the negative pressure area to the rear of the vehicle can be more reduced.

According to the above configuration, the inner pressure reduction in the tire housing S for the rear wheel WR increases the grounding load of the rear wheel WR to increase the grip force of the tire. Further, air can be passed through the tire housing S covered by the cover to cool a brake disk.

The lighting unit 43 is installed above the rear fender 35 and the first negative pressure correction holes 45, 45 are provided between the rear fender 35 and the lighting unit 43. This can make the first negative pressure correction holes 45, 45 inconspicuous, thereby improving the degree of freedom of design.

Further, the eave portion 39 is provided on the rear fender 35 so as to project obliquely downwardly. The second negative pressure correction holes 46, 46 are provided on the back side of the eave portion 39. The air-flow discharged from the second negative pressure correction holes 46, 46 is made to move toward the negative pressure center rearwardly of the vehicle. In this way, since the air-flow is led along the rear side of the eave portion 39, it can be led to the center of the negative pressure area, thereby effectively reducing the negative pressure area. The second negative pressure correction holes 46, 46 are provided at a place hidden by the eave portion 39. This can make the second negative pressure correction holes 46, 46 inconspicuous, thereby improving the degree of freedom of design.

The central trunk 22 is provided above the rear fender 35 and the rear center cover 28 located below the central trunk 22 is further provided with the third negative pressure correction holes 47, 47. Such a configuration can provide the third negative pressure correction holes 47, 47 inconspicuously, thereby improving the degree of freedom of design. More specifically, the trunk box main body 25 of the central trunk 22 protrudes rearwardly and the third negative pressure correction holes 47, 47 are provided at a deep portion between the trunk box main body 25 and the rear fender 35. Therefore, the third negative pressure correction holes 47, 47 can be made inconspicuous, thereby improving the degree of freedom of design.

The rear side covers 20L, 20R are provided with the ventilating holes 21L, 21R in front of the left and right trunks 23, 24, respectively. This can reduce pressure concentration at the respective front portions of the left and right trunks 23, 24 due to flow of air, which can more reduce travel resistance. A pressure-receiving area can be reduced to reduce yawing moment applied to the vehicle body due to side wind.

In addition, the configuration of the present embodiment is an example of the present invention. Needless to say, the configuration, structure, shape, size, number, arrangement, etc. of component parts can be modified in various ways. For example, in the present embodiment, the present invention is applied to the motorcycle. However, the present invention can preferably be applied to three-wheeled vehicles in which left and right wheels are provided on the front and a single wheel is provided on the rear.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear structure of a straddle-ride type vehicle including a left trunk and a right trunk in a rear portion of the vehicle, comprising:
   a rear fender continuous with respective rear faces of the left and right trunks;
   wherein a plane formed of rear faces of each of the left and right trunks and the rear fender is provided with a first negative pressure correction hole,
   wherein a lighting unit is provided above the rear fender and the first negative pressure correction hole is provided between the rear fender and the lighting unit.

2. The rear structure of the straddle-ride type vehicle according to claim 1, wherein a central trunk is provided above the rear fender and a third negative pressure correction hole is further provided at a lower portion of the central trunk.

3. The rear structure of the straddle-ride type vehicle according to claim 1, wherein a ventilating hole is provided forward of each of the left and right trunks.

4. The rear structure of the straddle-ride type vehicle according to claim 2, wherein a ventilating hole is provided forward of each of the left and right trunks.

5. A rear structure of the straddle-ride type vehicle including a left trunk and a right trunk in a rear portion of the vehicle, comprising:
   a rear fender continuous with respective rear faces of the left and right trunks;
   wherein a plane formed of the respective rear faces of the left and right trunks and the rear fender is provided with a first negative pressure correction hole,
   wherein the rear fender is provided with an eave portion projecting obliquely downwardly, and a second negative pressure correction hole is provided on left and right sides of the eave portion, and air discharged from the second negative pressure correction hole is made to flow toward a center of a negative pressure area to the rear of the vehicle.

6. The rear structure of the straddle-ride type vehicle according to claim 5, wherein a central trunk is provided above the rear fender and a third negative pressure correction hole is further provided at a lower portion of the central trunk.

7. The rear structure of the straddle-ride type vehicle according to claim 5, wherein a ventilating hole is provided forward of each of the left and right trunks.

8. A rear structure for a vehicle comprising:
- a left trunk operatively positioned on a left side towards a rear portion of the vehicle, said left trunk including a front face, a rear face and a side face;
- a right trunk operatively positioned on a right side towards the rear portion of the vehicle, said right trunk including a front face, a rear face and a side face;
- a rear fender continuous with the respective rear faces of the left and right trunks; and
- a first negative pressure correction hole being formed on a plane formed of the respective rear faces of the left and right trunks and the rear fender,
- wherein a central trunk is provided above the rear fender, and
- a third negative pressure correction hole is further provided at a lower portion of the central trunk.

9. The rear structure for a vehicle according to claim 8, wherein a lighting unit is provided above the rear fender and the first negative pressure correction hole is provided between the rear fender and the lighting unit.

10. The rear structure for a vehicle according to claim 8, wherein the rear fender is provided with an eave portion projecting obliquely downwardly, a second pressure correction hole is provided on at least one of a left side and a right of the eave portion, and air discharged from the second negative pressure correction hole is made to flow toward a center of a negative pressure area to the rear of the vehicle.

11. The rear structure for a vehicle according to claim 8, wherein a ventilating hole is provided forward of each of the left and right trunks.

12. The rear structure for a vehicle according to claim 9, wherein a ventilating hole is provided forward of each of the left and right trunks.

13. The rear structure for a vehicle according to claim 10, wherein a ventilating hole is provided forward of each of the left and right trunks.

* * * * *